(12) United States Patent
Pellini (10) Patent No.: US 10,450,992 B2
(45) Date of Patent: Oct. 22, 2019

(54) GDI PUMP WITH DIRECT INJECTION AND PORT INJECTION

(71) Applicant: Stanadyne LLC, Windsor, CT (US)

(72) Inventor: Richard Paulo Pellini, South Windsor, CT (US)

(73) Assignee: Stanadyne LLC, Windsor, CT (US)

(*) Notice: Subject to any disclaimer, the term of this patent is extended or adjusted under 35 U.S.C. 154(b) by 18 days.

(21) Appl. No.: 15/797,201

(22) Filed: Oct. 30, 2017

(65) Prior Publication Data
US 2019/0128208 A1    May 2, 2019

(51) Int. Cl.
| F02D 41/30 | (2006.01) |
| F02M 59/02 | (2006.01) |
| F02D 41/38 | (2006.01) |
| F02M 55/02 | (2006.01) |
| F02M 63/02 | (2006.01) |
| F02M 59/46 | (2006.01) |
| F02M 69/04 | (2006.01) |

(52) U.S. Cl.
CPC ..... *F02D 41/3094* (2013.01); *F02D 41/3845* (2013.01); *F02M 55/02* (2013.01); *F02M 55/025* (2013.01); *F02M 59/022* (2013.01); *F02M 59/462* (2013.01); *F02M 63/029* (2013.01); *F02M 69/046* (2013.01); *F02M 2200/40* (2013.01); *F02M 2700/1376* (2013.01)

(58) Field of Classification Search
CPC ............. F02D 41/3094; F02D 41/3845; F02D 41/3836; F02D 41/406; F02D 41/3082; F02D 2041/3881; F02M 55/025; F02M 55/02; F02M 59/022
See application file for complete search history.

(56) References Cited

U.S. PATENT DOCUMENTS

| 7,517,200 | B2 | 4/2009 | Ferleyko et al. |
| 2013/0233284 | A1 | 9/2013 | Thaysen |
| 2015/0198081 | A1* | 7/2015 | Surnilla ............... F02D 41/3094 123/294 |
| 2015/0285166 | A1* | 10/2015 | Surnilla ................ F02D 33/003 123/294 |
| 2015/0337753 | A1 | 11/2015 | Stickler |

(Continued)

FOREIGN PATENT DOCUMENTS

EP    2541037 A1    1/2013

OTHER PUBLICATIONS

PCT International Search Report and Written Opinion dated Jan. 28, 2019 (PCT Appl. PCT/US2018/058270).

*Primary Examiner* — George C Jin
(74) *Attorney, Agent, or Firm* — Alix, Yale & Ristas, LLP (57) ABSTRACT

In a hybrid fuel supply system for the same high pressure supply pump used for gasoline direct injection (DI) is also used to supply the port injection (PI) system. For a given pumping stroke, fuel can be delivered only to the DI system, only to the PI system, or a first portion can be delivered to the DI system and a second portion delivered to the PI system. The pumping chamber always fills to maximum volume. Fuel metering for DI is by a control valve, which when closed delivers fuel into the DI system and when opened "spills" pumped fuel into the PI system. Any "spill" at high pressure opens a pressure regulating valve in the PI system that dumps fuel at excess pressure to a low pressure region to maintain the PI system at a constant target pressure.

16 Claims, 6 Drawing Sheets

(56) References Cited

U.S. PATENT DOCUMENTS

| | | | |
|---|---|---|---|
| 2016/0169145 A1* | 6/2016 | Surnilla | F02D 41/345 701/104 |
| 2016/0169147 A1* | 6/2016 | Surnilla | F02D 41/2467 123/299 |
| 2016/0377019 A1 | 12/2016 | Russ | |
| 2017/0260925 A1* | 9/2017 | Ikeuchi | F02D 41/3094 |

\* cited by examiner

GDI PUMP WITH DIRECT INJECTION AND PORT INJECTION

BACKGROUND

The present invention relates to fuel pumps for gasoline direct injection (GDI) engines.

Engine manufacturers use both port injection (PI) and direct injection (DI) fuel systems concurrently on some engines as a strategy to improve emissions results. PI and DI are used individually or simultaneously depending on engine operating regimes. Very high DI supply pressure is desired for achieving high quality of the injection.

The PI system relies on the pressure of the low-pressure feed pump (LPP), typically installed in the fuel tank. The same LPP feeds the inlet pressure of the high pressure pump (HPP) pump, a separate pump installed in the engine bay for use in the DI system. The LPP's are known for efficiency and durability, but over time suffer reduction in maximum delivery pressure.

SUMMARY

According to the present disclosure, the same high pressure supply pump used for GDI direct injection is also used simultaneously as a supplier of the DI and the PI systems.

With this dual function pump, the PI maximum pressure capability can be higher than available with LLP feed pumps, with a better maximum pressure retention until end-of-life.

With the function of supplying fuel to the PI system now assumed by the HPP, the demands on the LPP are reduced and the design can be simplified, with no sacrifice in performance of the PI system or the DI system.

PI pressure modulation can be achieved by incorporating a separate pressure regulation device.

Optimization of the fuel supply system can produce lower power requirements if the added power demand on the dual function pump is lower than the power required for PI supply with an LPP pump.

Under operating conditions where the PI supply pressure is interrupted or affected by the DI operating mode, an accumulator in the PI injection system can maintain the desired PI inlet pressure.

For a given pumping stroke, fuel can be delivered only to the DI system, only to the PI system, or a first portion can be delivered to the DI system and a second portion delivered to the PI system. For each of these three scenarios, the quantity delivered to the DI system common rail and/or the PI system accumulator, can be controlled.

No metering is needed upstream of the pumping chamber. The pumping chamber always fills to maximum volume. Fuel metering for DI is via a "fill and spill" analog whereby the quantity control is set by a control valve, which when closed delivers fuel into the DI system and when opened "spills" pumped fuel into the PI system. Any "spill" at high pressure opens a pressure regulating valve in the PI system that dumps fuel at excess pressure to a low pressure region to maintain the PI system at a constant target pressure. The quantity delivered to the common rail of the DI system could be all or a portion of the maximum pumped volume, depending on whether any fuel is delivered to the PI system. Similarly, the quantity delivered to the PI system could be all or a portion of the maximum pumped volume, depending on whether any fuel is delivered to the DI system. Fuel quantity is metered to the common rail via "spill" to the PI system, whereas PI system pressure is regulated without quantity metering.

BRIEF DESCRIPTION OF THE DRAWING

An embodiment of the invention will be described below with reference to the accompanying drawing, in which.

DESCRIPTION

Figure 1:
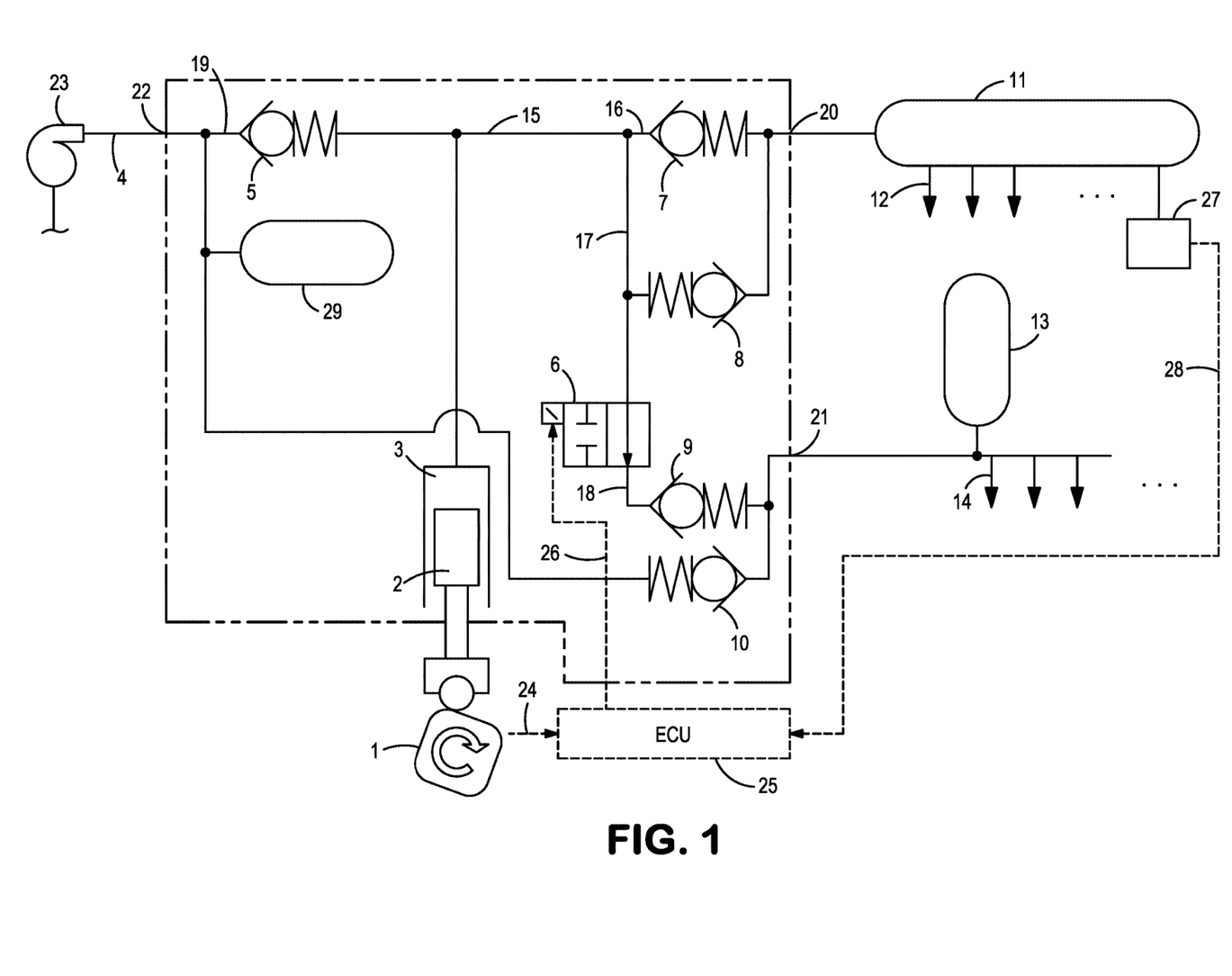
FIG. 1 is a schematic of a hydraulic circuit for pumping fuel to the DI and PI systems of a gasoline engine according to the present disclosure.

FIG. 1 is a schematic of the preferred hydraulic circuit for implementing the present invention. A dual function pump is shown within the dark, dashed lines, whereby the engine cam 1 reciprocates a plunger 2 within a pumping chamber 3. A low pressure feed pump 23 delivers low pressure feed fuel via line 4 through inlet port 22 of the pump into feed passage 19, which is stabilized by accumulator 29. Inlet check valve 5 is fluidly connected to the pumping chamber 3 whereby low pressure feed fuel fills the pumping chamber during the retracted or charging stroke of the plunger 2. During the pumping stroke, the highly pressurized fuel flows into the discharge passage 15, which has two branches. A direct injection passage 16 with associated downstream outlet check valve 7 is in fluid connection with a first pumped fuel outlet 20, for delivery to the common rail 11 in a direct injection mode of operation, supplying the direct injectors 12. A second, auxiliary branch line or passage 17 is also fluidly connected to the discharge passage 15 upstream of the first outlet check valve 7. A control valve 6 has an inlet side in fluid communication with the auxiliary passage 17 and an outlet side connected to a port injection passage 18 extending through second outlet check valve 9 to a second pumped fuel outlet 21 leading to the port injectors 14.

The control valve 6 is a directly operated two-way, two position, normally open solenoid valve, which is energized to close.

A first pressure relief valve 8 is connected between the direct injection passage 16 downstream of the first outlet check valve 7, and the auxiliary passage 17 (or otherwise to the pressure prevailing at the pumping chamber 3). A second pressure relief valve 10 is connected between the injection passage 18 downstream of the second outlet check valve 9 and the feed passage 19 or equivalent low inlet or feed pressure region. An accumulator 13 is situated in downstream fluid communication with the second outlet check valve 9, to maintain a stable pressure for the port injectors 14 during switching between the PI and DI systems, as will be described in greater detail below.

As can be understood from FIG. 1, the dual function of the GDI pump supports numerous distinct operating conditions or states, providing: (1) low-pressure flow from the feed pump to the PI system and to the DI common rail in the event the HHP pump is inoperable (bypass, or "limp-home"

mode); (2) zero flow to the DI common rail or to the PI system; (3) a metered amount of flow at high pressure to the DI common rail; and (4) regulated pressure to the PI system.

The system is based on the concept that the amount of fuel consumed by the engine is constant, regardless of its operating condition and the balance of injection through the PI and the DI systems. The total amount of fuel consumed for a given generated power is the same regardless of which system, or systems, is being used.

The preferred strategy is to maintain the desired DI system pressure by metering the pumping volume transferred to the DI system. All remaining pumping volume not transferred to the DI system is transferred to the PI system. The PI system target pressure is generally about 10 bar whereas the DI system pressure target is generally about 350 bar. The maximum pressure of the PI system is maintained by a pressure regulating scheme of accumulator 13 and second pressure relief valve 10 whereby all excess flow is delivered to the inlet feed passage (4 or 19), and it is fixed for all operating conditions.

HPP Bypass

Figure 2:
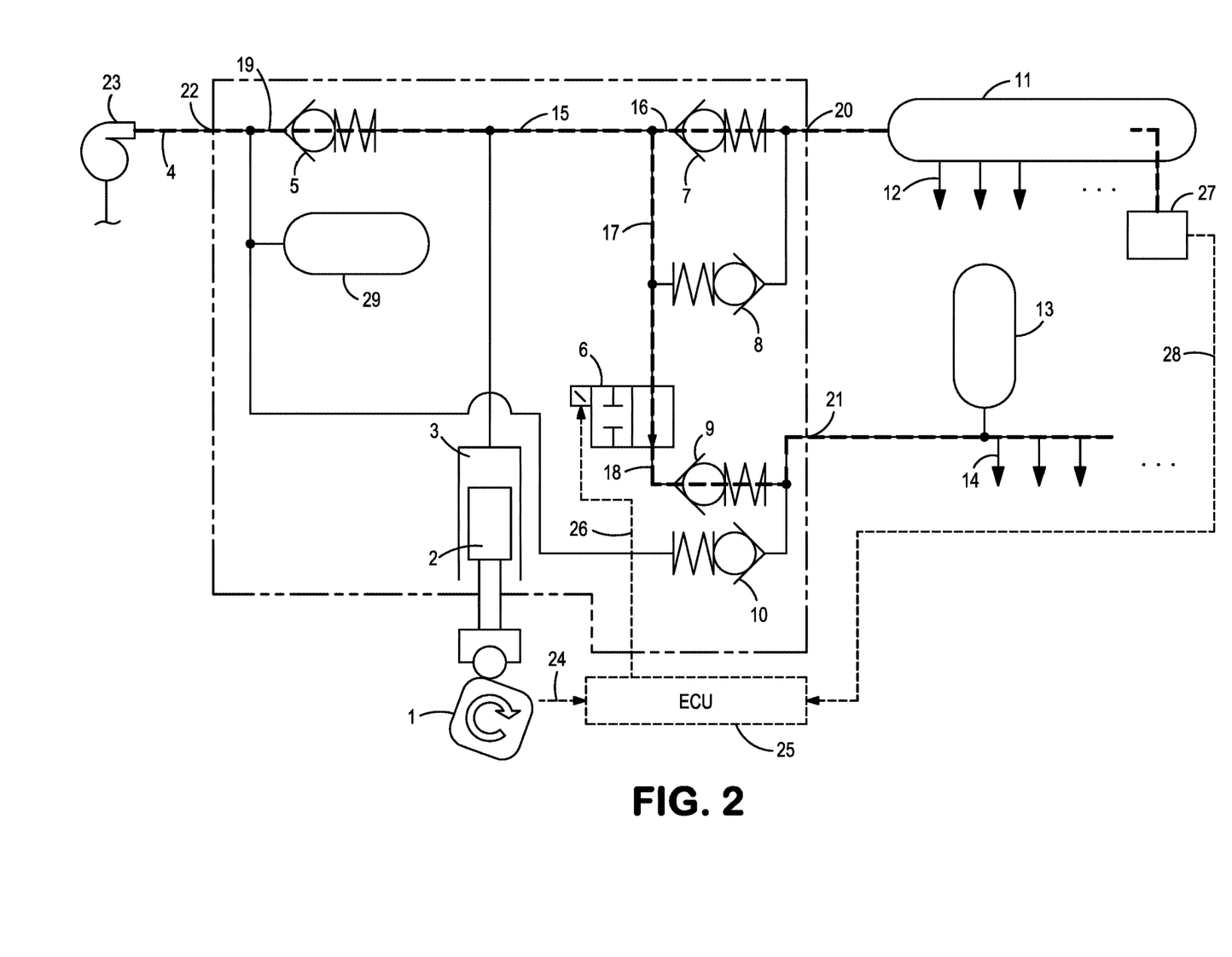
FIG. 2 shows how the circuit of FIG. 1 is configured for a bypass mode of operation.

As shown in FIG. 2, during the HPP bypass condition the HPP is assumed inoperable, with control valve 6 inactive. Fluid pressure in passage 19 from the low-pressure supply pump 23 opens inlet check valve 5. Downstream pressure will also open first outlet check valve 7, pressuring the DI common rail 11, and second check valve 9, pressurizing the PI accumulator 13.

Port Injection Circuit Pressurization

Figure 3:
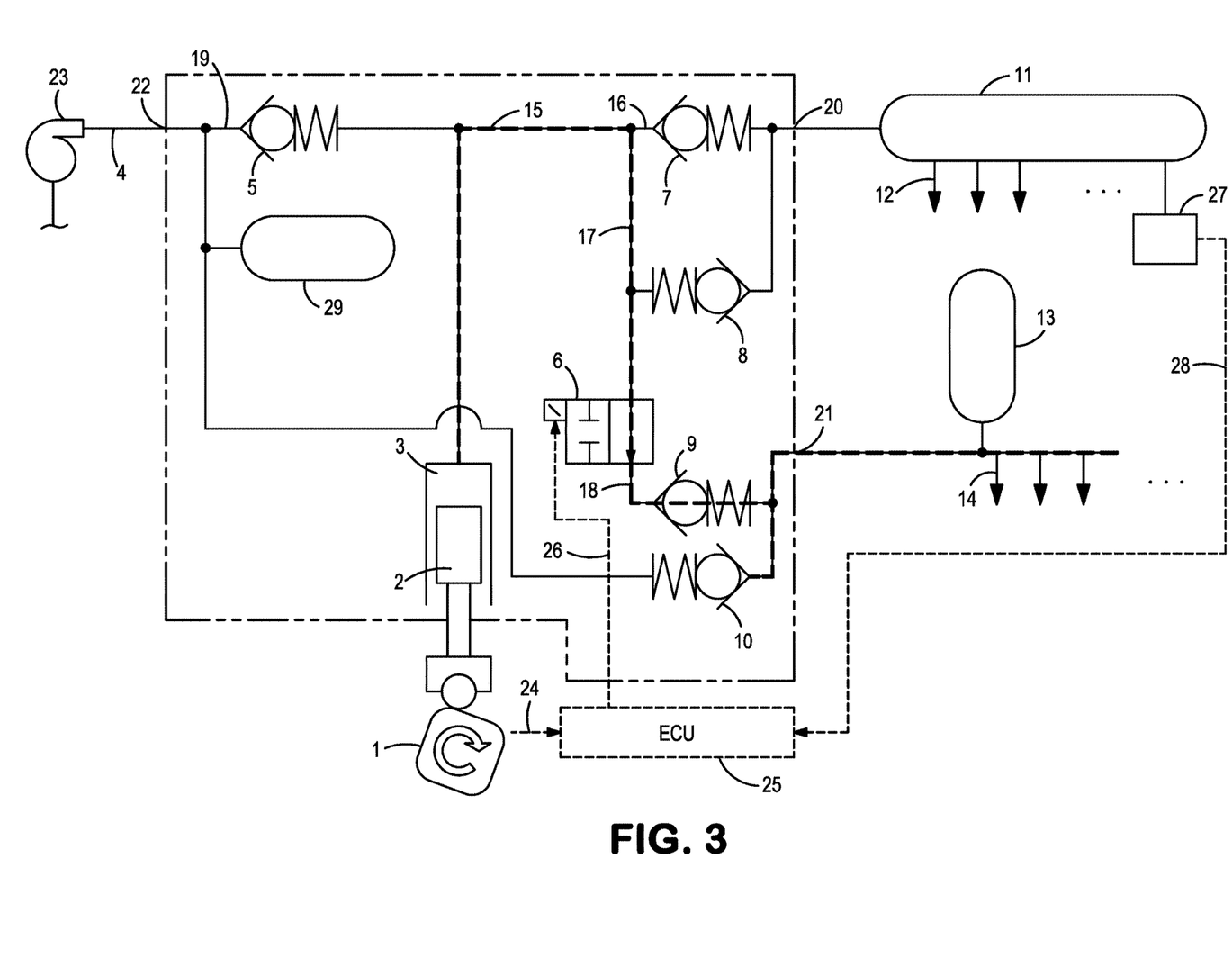
FIG. 3 shows how the circuit of FIG. 1 is controlled for PI pressurization.

As shown in FIG. 3, during the PI pressurization condition, the pump is assumed operable, and all or partial pumping volume is transferred to the PI system. During the charging cycle control valve 6 is de-energized. Fluid downstream from inlet check valve 5 enters the pumping chamber 3 during the charging cycle. At the end of the charging cycle inlet check valve 5 is closed by the valve bias spring. During the pumping cycle, fluid flows through control valve 6, the pressure rises to open the second outlet check valve 9, and fluid is transferred to the PI circuit. Because the DI system operating pressure is higher than the PI system operating pressure, the pumping pressure cannot open the first outlet check valve 7.

The volume transferred to the PI circuit is limited by the closing of control valve 6. Upon energizing and closing of the control valve 6 the pumping pressure will increase above the opening pressure of the first outlet check valve 7 and all remaining pumping volume is then transferred to the DI circuit.

Port Injection Pressure Limitation

Figure 4:
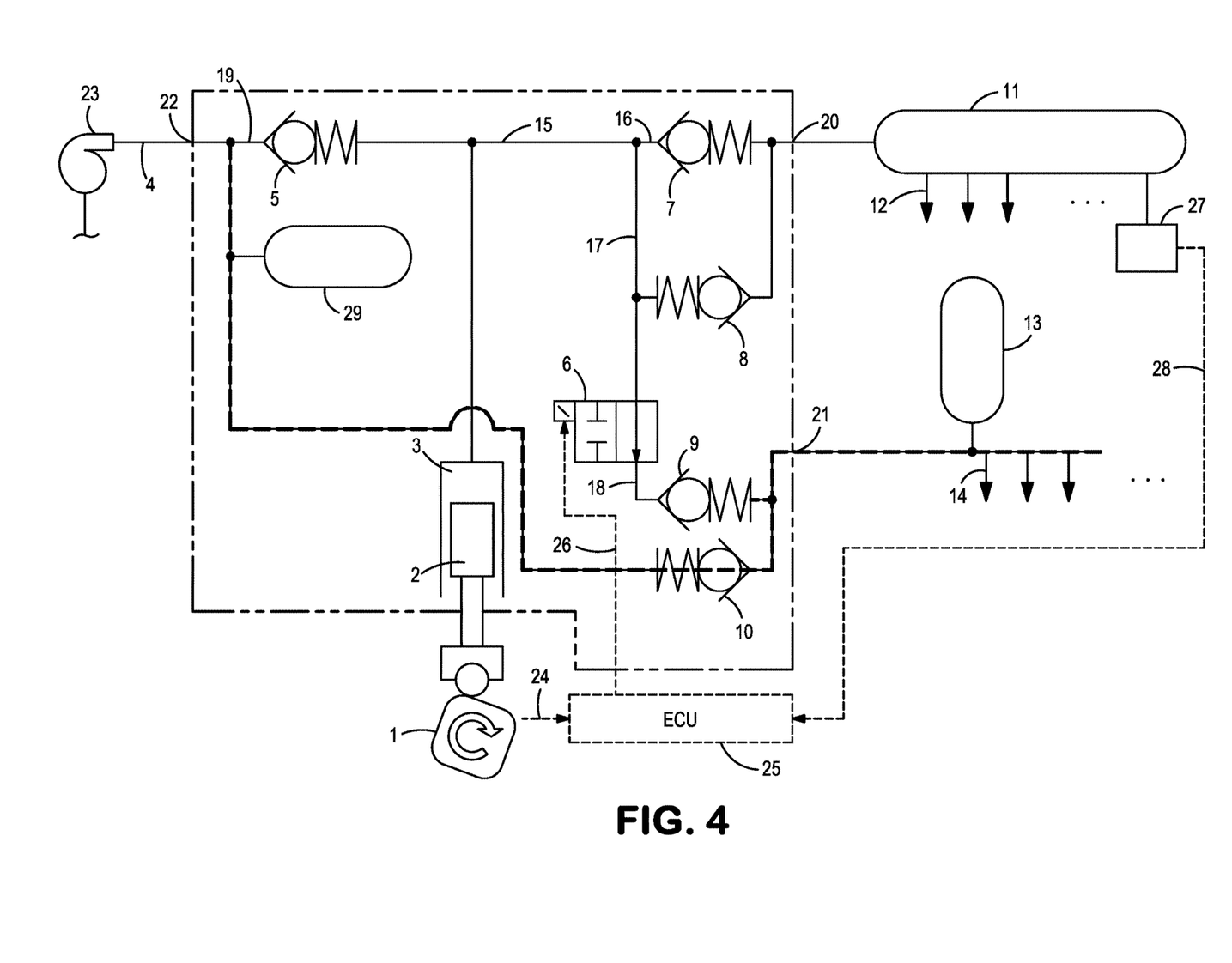
FIG. 4 shows how the circuit of FIG. 1 is controlled for PI pressure regulation.

During overall metering to the injectors, the pump is operable and the fuel transferred to the PI system is determined by the closing of control valve 6. As shown in FIG. 4, when the PI system pressure is above the opening pressure of pressure relief valve 10, the valve opens, flowing excess volume from the PI system to the low feed pressure passage 19 or region. The configuration is such that the excess flow may occur concurrently with the pumping cycle. Therefore, the amount of fluid transferred to the PI system is dependent only on the PI system pressure, with no metering of transferred volume.

Direct Injection Circuit Pressurization

Figure 5:
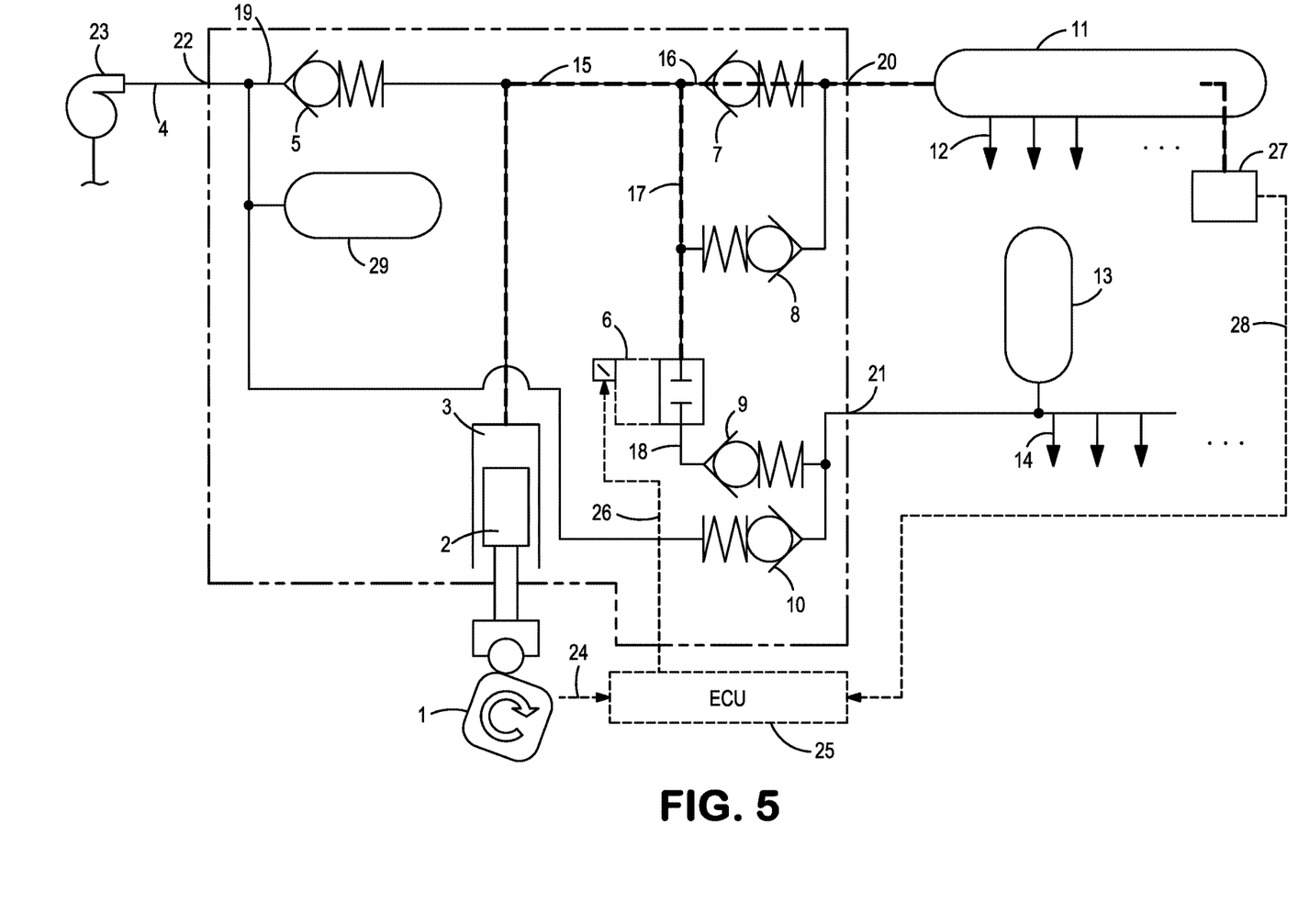
FIG. 5 shows how the circuit of FIG. 1 is controlled for DI pressurization.

As shown in FIG. 5, during the DI pressurization condition, the pump is assumed operable and all or partial pumping volume is transferred to the DI system. During the charging cycle control valve 6 is deenergized. Fluid downstream from inlet check valve 5 enters the pumping chamber 3 during the charging cycle. At the end of the charging cycle the inlet check valve 5 is closed by the valve bias spring. During the pumping cycle, control valve 6 is closed. Pumping pressure increases and opens outlet check valve 7 transferring volume to the DI circuit.

Actuation of control valve 6 is synchronized with the position of the pumping piston. This is achieved by sensing the cam rotational position 24 and processing of that input in the electronic control unit (ECU) 25, which transmits a control signal 26 to the control valve 6. Thus, the only volume transferred is the remaining fluid in the pumping chamber 3 at the time control valve 6 is energized (ignoring losses due to leakage and fluid compressibility). The volume transferred to the PI system is limited by the closing of control valve 6. Upon energizing and closing of control valve 6, the pumping pressure will increase above the opening pressure of the first outlet check valve 7. All remaining pumping volume is then transferred to the DI system.

Once closed, control valve 6 remains shut, even if the solenoid is de-energized, until the pumping event is complete and the pumping chamber pressure drops to near zero, whereupon the valve opens.

Direct Injection Pressure Limitation

Figure 6:
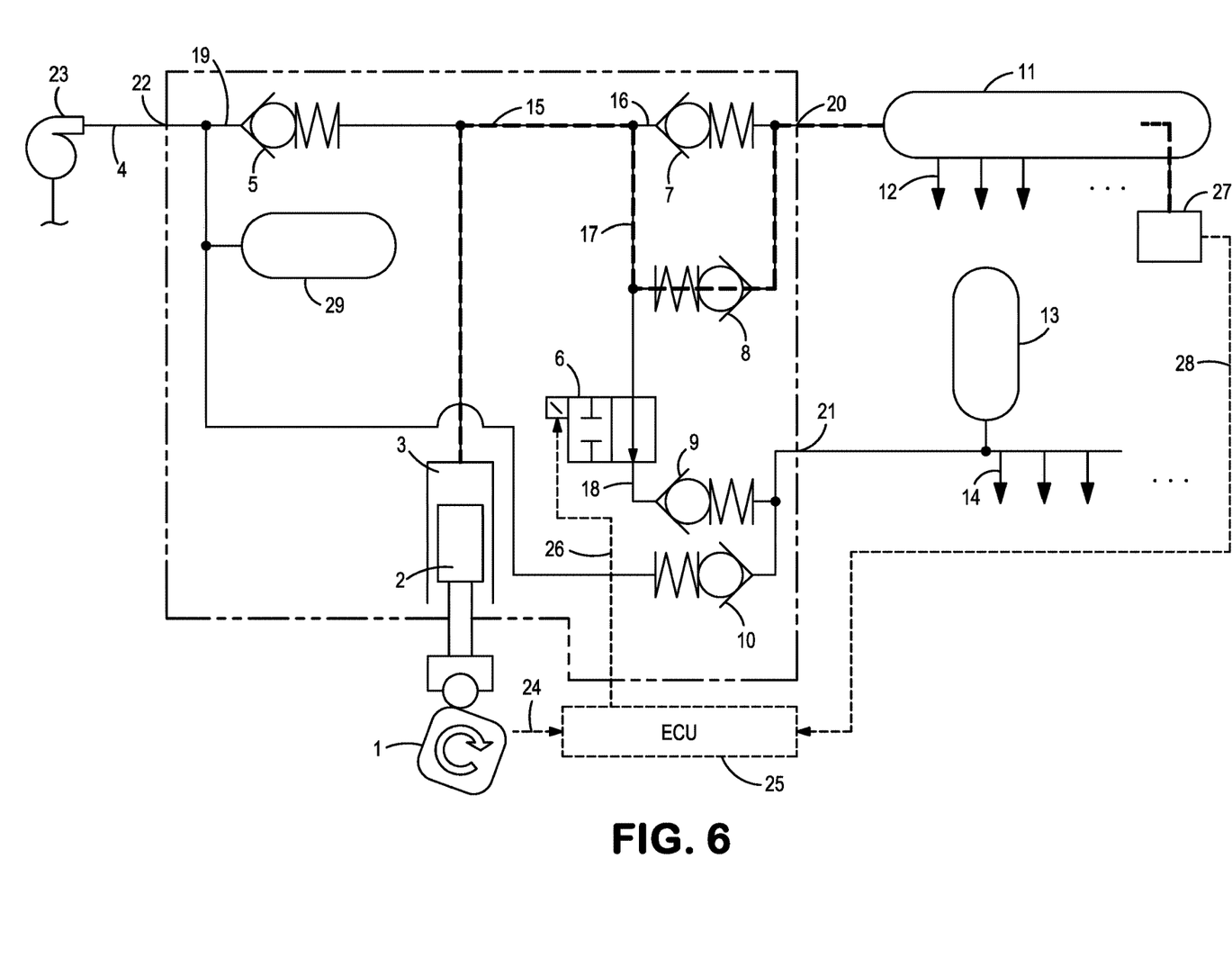
FIG. 6 shows how the circuit of FIG. 1 is controlled for DI pressure regulation.

During the overall metering to the injectors, the pump is assumed operable and the fuel transferred to the PI system is the fuel metered by the closing of control valve 6. As shown in FIG. 6, when the DI system pressure is above the opening pressure of the pressure relief valve 8, the valve opens draining volume from the DI system to the pumping chamber 3.

Variable Quantity

With general reference to FIG. 1, it should thus be appreciated that the present invention can provide variable quantity and mode of fuel delivery to one or both of the DI and PI systems. If only a DI system is to be employed, the quantity control or metering of fuel is achieved by the pumping chamber 3 filling with the maximum volume of fuel while the control valve 6 is closed and during the pumping stroke, a quantity of fuel corresponding to a first portion of the pumping stroke is delivered to the common rail 11, until the control valve opens in response to a preselected algorithm or mapping, dependent on the position of the pumping plunger during the pumping stroke. The mapping is based in part on sensing 27 of pressure in the common rail 11, with a signal 28 delivered to the ECU 25. Thus, all or a partial quantity of fuel corresponding to the maximum volume of the pumping chamber can be delivered to the common rail.

If only port injection is to be implemented, the control valve 6 remains open and all of the maximum volume in the pumping chamber is delivered through the control valve 6 and second outlet check valve 9, to the accumulator 13, but as soon as the pressure reaches the set point of the pressure relief valve 10, the quantity of fuel in excess of that corresponding to delivery to the accumulator 13 is passed through the second outlet check valve 10 to a low pressure region. Unlike the active metering control available for the DI system, the PI system operates at a steady pressure associated with the opening pressure of pressure relief valve 10.

Both the PI and DI systems can operate concurrently. Usually, the PI system would be pressurized first, followed by the DI system, but the order can be reversed. Although the maximum volume of the pumping chamber is pumped out of the pumping chamber into the discharge line 15, and all of that volume is allocated between the DI system 7, 8, and 16, and the PI system 9, 10, and 18, the respective quantities of fuel delivered to the common rail 11 and accumulator 13, respectively, can total less than the maximum volume of the pumping chamber 3, due to the operation of one or both of the relief valves 8 and 9.

If the PI system is to be pressurized first, during the charging stroke the pumping chamber 3 fills with fuel to a maximum volume. During a first portion of the pumping stroke the control valve 6 is open and a first quantity of fuel is pumped through the second outlet check valve 9, corresponding to a first portion of the maximum volume. During a second portion of the pumping stroke the control valve 6 is closed and a second quantity of fuel is pumped through the first outlet check valve 7, corresponding to a second portion of fuel consisting of all the fuel remaining in the pumping chamber.

If the DI system is pressurized first, during the charging stroke the pumping chamber 3 fills with fuel to a maximum volume. During a first portion of the pumping stroke the control valve 6 is closed and a first quantity of fuel is pumped through the first outlet check valve 7, corresponding to a first portion of the maximum volume. During a second portion of the pumping stroke the control valve 6 is open and a second quantity of fuel is pumped through the second outlet check valve 9, corresponding to a second portion of fuel consisting of all the fuel remaining in the pumping chamber.

The invention claimed is:

1. A fuel pump for a fuel supply system having some injectors supplied by a pressurized common rail and other injectors supplied through inlet ports, comprising:
    a feed passage (19) with inlet check valve (5);
    a pumping plunger (2) reciprocable in a pumping chamber (3) that is fluidly connected to the feed passage downstream of the inlet check valve, for pressurizing the feed of fuel;
    a discharge passage (15) from the pumping chamber for delivering pressurized fuel to a first outlet check valve (7);
    a direct injection passage (16) extending through the first outlet check valve for fluid connection of the pump to a common rail (11);
    an auxiliary passage (17) in fluid communication with the discharge passage (15) upstream of the first outlet check valve;
    a control valve (6) having an inlet side in fluid communication with the auxiliary passage (17) and an outlet side, wherein the control valve selectively closes against flow through the control valve or opens to permit flow through the outlet side of control valve; and
    a port injection passage (18) from the outlet side of the control valve for fluid connection of the pump to an inlet port on individual injectors (14), through a second outlet check valve (9).

2. The fuel pump of claim 1, comprising:
    a first pressure relief valve (8) connected between the direct injection passage (16) downstream of the first outlet check valve (7) and a flow path in fluid communication with the pumping chamber (3); and
    a second pressure relief valve (10) connected between the port injection passage (18) downstream of the second outlet check valve (9) and said feed passage (19).

3. The fuel pump of claim 1, wherein in a bypass mode of operation,
    the plunger does not reciprocate;
    fuel in the feed passage (19) flows at feed pressure through the pumping chamber (3), the discharge passage (15), the direct injection passage (16) and the first outlet check valve (7); and
    fuel in the discharge passage (15) also flows through the auxiliary passage (17), the control valve (6), and the second outlet check valve (9).

4. The fuel pump of claim 1, wherein in a port injection mode of operation,
    the plunger pressurizes fuel from the feed passage;
    the control valve (6) is open; and
    fuel flows through the auxiliary line (17), control valve, and second outlet check valve (9) while the first outlet check valve (7) is closed.

5. The fuel pump of claim 4, wherein in a direct injection mode of operation,
    the plunger pressurizes fuel from the feed passage;
    the control valve (6) is closed, preventing flow from the auxiliary passage (17) to the second outlet check valve (9); and
    at least some of the pumped fuel flows through the first outlet check valve (7).

6. The fuel pump of claim of claim 3, wherein
    in a port injection mode of operation,
        the plunger pressurizes fuel from the feed passage;
        control valve (6) is open; and
        fuel flows through the auxiliary line (17), control valve, and second outlet check valve (9) while the first outlet check valve (7) is closed; and
    in a direct injection mode of operation,
        the plunger pressurizes fuel from the feed passage;
        the control valve (6) is closed, preventing flow from the auxiliary passage (17) to the second outlet check valve (9); and
        at least some of the pumped fuel flows through the first outlet check valve (7).

7. The fuel pump of claim 1, wherein the pumping plunger has a charging stroke and a pumping stroke, and the opening or closing of the control valve is responsive to a signal from an electronic control unit (25) that receives an input signal corresponding to the position of the plunger during the pumping stroke.

8. The fuel pump of claim 7, wherein
    during the charging stroke the pumping chamber (3) fills with fuel to a maximum volume;
    during a first portion of the pumping stroke the control valve (6) is closed and a first quantity of fuel is pumped through the first outlet check valve (7), corresponding to a first portion of the maximum volume; and
    during a second portion of the pumping stroke the control valve (6) is open and a second quantity of fuel is pumped through the second outlet check valve (9), corresponding to a second portion of fuel consisting of all the fuel remaining in the pumping chamber.

9. The fuel pump of claim 7, wherein
    during the charging stroke the pumping chamber (3) fills with fuel to a maximum volume;
    during a first portion of the pumping stroke the control valve (6) is open and a first quantity of fuel is pumped through the second outlet check valve (9), corresponding to a first portion of the maximum volume; and
    during a second portion of the pumping stroke the control valve (6) is closed and a second quantity of fuel is pumped through the first outlet check valve (7), corresponding to a second portion of fuel consisting of all the fuel remaining in the pumping chamber.

10. The fuel pump of claim 8, comprising:
    an accumulator (13) situated in downstream fluid communicating with the second outlet check valve (9);

a first pressure relief valve (8) connected between the direct injection passage (16) downstream of the first outlet check valve (7) and a flow path (17, 15) in fluid communication with the pumping chamber (3); and a second pressure relief valve (10) connected between the port injection passage (18) downstream of the second outlet check valve (9) and said feed passage (19).

11. The fuel pump of claim 9, comprising:

an accumulator (13) situated in downstream fluid communicating with the second outlet check valve (9);

a first pressure relief valve (8) connected between the direct injection passage (16) downstream of the first outlet check valve (7) and a flow path (17, 15) in fluid communication with the pumping chamber (3); and a second pressure relief valve (10) connected between the port injection passage (18) downstream of the second outlet check valve (9) and said feed passage (19).

12. A fuel pump for a fuel supply system having some injectors supplied by a pressurized common rail and other injectors supplied through inlet ports, comprising:

a pumping plunger (2) reciprocable in a pumping chamber (3);

a direct injection passage (16) with a first outlet check valve (7), for selective fluid communication between the pumping chamber and a fluid connection (20) of the pump to a common rail (11);

a control valve (6) having an inlet side and an outlet side, said control valve allocating fuel flow to the fluid connection (20) of the pump to the common rail (11) and the fluid connection (21) of the pump to individual port injectors (14); and a port injection passage (18) from the outlet side of the control valve for selective fluid communication between the pumping chamber and a fluid connection (21) of the pump to an inlet port on individual injectors (14), through a second outlet check valve (9).

13. A fuel pump comprising:

a feed passage (19) with inlet check valve (5);

a pumping plunger (2) reciprocable in a pumping chamber (3) that is fluidly connected to the feed passage downstream of the inlet check valve (5), for pressurizing the feed of fuel;

a first pumped fuel outlet (20) in selective fluid communication with the pumping chamber (3);

a second pumped fuel outlet (21) in selective fluid communication with the pumping chamber (3);

a control valve (6) having an inlet side and an outlet side, said control valve allocating fuel flow to the first pumped fuel outlet (20) and the second pumped fuel outlet (21); and a port injection passage (18) from the outlet side of the control valve for fluid communication of the pump to an inlet port on individual injectors (14), through a second outlet check valve (9).

14. The fuel pump of claim 13, wherein the control valve (6) is a solenoid control valve (6) including two positions, open and closed, and is in fluid communication with the pumping chamber (3).

15. The fuel pump of claim 14, wherein the pumping plunger (2) has a charging stroke and a pumping stroke, and the control valve (6) opens or closes in response to a signal from an electronic control unit (25) that receives an input signal corresponding to the stroke position of the plunger during the pumping stroke.

16. The fuel pump of claim 15, wherein the means for allocating fuel flow includes a direct injection passage (16) with the first outlet check valve (7), for selective fluid communication between the pumping chamber (3) and the first pumped fuel outlet (20);

a port injection passage (18) with the second outlet check valve (9), for selective fluid communication between the pumping chamber (3) and the second pumped fuel outlet (21);

the first pressure relief valve (8) connected between the direct injection passage (16) downstream of the first outlet check valve (7) and a flow path in fluid communication with the pumping chamber (3); and the second pressure relief valve (10) connected between the port injection passage (18) downstream of the second outlet check valve (9) and a low pressure infeed region (19).

\* \* \* \* \*